US009015464B2

(12) United States Patent
Chen et al.

(10) Patent No.: US 9,015,464 B2
(45) Date of Patent: Apr. 21, 2015

(54) ELECTRONIC DEVICE AND START-UP METHOD THEREOF

(71) Applicants: Inventec (Pudong) Technology Corporation, Shanghai (CN); Inventec Corporation, Taipei (TW)

(72) Inventors: Chih-Ming Chen, Taipei (TW); Chian-Ting Chen, Taipei (TW); Chung-Yu Wu, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 284 days.

(21) Appl. No.: 13/846,246

(22) Filed: Mar. 18, 2013

(65) Prior Publication Data

US 2014/0115313 A1 Apr. 24, 2014

(30) Foreign Application Priority Data

Oct. 22, 2012 (CN) .......................... 2012 1 0406265

(51) Int. Cl.
*G06F 1/26* (2006.01)
*G06F 9/44* (2006.01)
*G06F 1/32* (2006.01)

(52) U.S. Cl.
CPC ................ *G06F 9/4401* (2013.01); *G06F 1/26* (2013.01); *G06F 1/266* (2013.01); *G06F 1/325* (2013.01); *G06F 1/3287* (2013.01); *Y02B 60/1282* (2013.01)

(58) Field of Classification Search
CPC ........... G06F 1/26; G06F 1/266; G06F 1/325; G06F 1/3287; G06F 9/4401; Y02B 60/1282
USPC .................................................... 713/300, 340
See application file for complete search history.

(56) References Cited

U.S. PATENT DOCUMENTS

| 7,613,939 | B2 * | 11/2009 | Karam et al. ................. 713/300 |
| 7,996,698 | B2 * | 8/2011 | Nguyen et al. ................ 713/340 |
| 8,225,124 | B2 * | 7/2012 | Geiger et al. ................. 713/340 |
| 2014/0188298 | A1 * | 7/2014 | Brooks et al. ................ 700/295 |

\* cited by examiner

*Primary Examiner* — Mark Connolly
(74) *Attorney, Agent, or Firm* — Tim Tingkang Xia, Esq.; Morris, Manning & Martin, LLP

(57) ABSTRACT

An electronic device and a method for starting up the same, wherein the electronic device includes a firmware control unit, a power supply state storage unit, a basic input output unit, and an Ethernet interface coupled to power supply apparatus to a Power over Ethernet to receive a power supply via a network cable. The firmware control unit determines whether the power supply state of the power supply is in a first power mode, by checking a power supply state signal. When the power supply state is not in the first power mode, the basic input output unit executes a second power booting program. The firmware control unit communicates with the power supply apparatus via a network, increases the rated power of the power supply, sets the power supply state signal for controlling the power supply state to be in the first power mode, and restarts the electronic device.

10 Claims, 3 Drawing Sheets

ELECTRONIC DEVICE AND START-UP METHOD THEREOF

CROSS-REFERENCE TO RELATED APPLICATIONS

This non-provisional application claims priority under 35 U.S.C. §119(a) on Patent Application No(s). 201210406265.2 filed in China on Oct. 22, 2012, the entire contents of which are hereby incorporated by reference.

BACKGROUND OF THE INVENTION

1. Technical Field of the Invention

The disclosure relates to an electronic device and a start-up method thereof which can be applied to the electronic device start-up technology and more particularly applied to the power over Ethernet (POE) technology.

2. Description of the Related Art

Power over Ethernet is a relatively novel power supply technology recently, which can transmit power and data to a corresponding electronic device via a twisted pair in the Ethernet. Since the power over Ethernet technology can enable the electronic device to be powered without modifying the cable architecture of the Ethernet, electronic devices (such as an Internet Phone, wireless access point, a Webcam, a hub, and a computer) applying the POE technology can be used without additional power supply sockets, which lowers the construction costs of the whole equipment system.

The POE technology is mainly divided into two parts: power supply apparatus as the powering end and a powered device (PD) as the powered end. In addition, the existing power over Ethernet technology supports two basic specifications: one is the 802.3af specification (also referred to as 802.3at first type specification) which provides a smaller electronic power (such as 12.95 watt (w)). Another is the 802.3at specification, and the 802.3at first type specification is compatible with the 802.3af specification, while the 802.3at second type specification can provide a larger electronic power (such as 25.5 watt (w) so as to drive a powered device with higher power consumption requirements.

The power supply apparatus can also be classified as a physical layer (Layer1) or a link layer (Layer2) when realizing how to detect the POE specification (such as 802.3af (802.3at first type) or 802.3at second type) of the powered device. Applying the physical layer (Layer1) is that, for example, the corresponding hardware is provided at both the power supply apparatus and the powered device, thereby actively detecting the POE specification of each other through the matched hardware. Although applying this method is very convenient, higher hardware costs are required. In addition, applying the above-mentioned link layer (Layer2) is that, for example, when the powered device requires a larger amount of electronic power, the powered device actively communicates with the power supply apparatus via a network using the link layer discovery protocol during operation, so as to change the POE specifications thereof from 802.3af (802.3at first type) to 802.3at second type.

However, if applying the link layer (Layer2), an ordinary powered device cannot start up the network function to change the POE specification before booting. Therefore, for electronic products requiring higher power consumption during booting, these electronic products cannot utilize the power over Ethernet technology to be powered during booting.

SUMMARY OF THE INVENTION

The disclosure relates to an electronic device including an Ethernet interface, a firmware control unit, a power supply state storage unit and a basic input output unit. The Ethernet interface is coupled to a power supply apparatus with a Power over Ethernet to receive a power supply via a network cable. The firmware control unit is coupled to the Ethernet interface to set a power supply state signal according to a rated power of the power supply. The power supply state storage unit is coupled to the firmware control unit to store the power supply state signal. The basic input output unit is coupled to the firmware control unit.

When the electronic device receives the power supply, the firmware control unit checks the power supply state signal so as to determine whether the power supply state of the power supply is in a first power mode. When the power supply state is not in the first power mode, the basic input output unit performs a second power booting program, so that the electronic device possesses a network communication function and the power consumption of the electronic device is smaller than or equal to the rated power of the power supply. The firmware control unit communicates with the power supply apparatus via a network so as to increase the rated power of the power supply to a first rated power value, set the power supply state signal to control the power supply state of the power supply to be in the first power mode, and restart the electronic device.

In one embodiment, when the power supply state is in the first power mode, the basic input output unit receives a start-up signal so as to execute a normal booting program to start up the electronic device.

In one embodiment, the electronic device and the power supply apparatus both support a 802.3af specification and a 802.3 second type specification.

In one embodiment, when the firmware control unit communicates with the power supply apparatus via the network, the power supply apparatus operates under the 802.3 second type specification instead of the 802.3af second type specification, so as to increase the rated power of the power supply to the first rated power value.

In one embodiment, the Ethernet interface generates a pull-out signal when the network cable is pulled out from the Ethernet interface, and the firmware control unit further receives the pull-out signal so as to reset the stored power supply state signal. In one embodiment, the power supply storage unit includes a data flip-flop and an OR gate. The data end of the data flip-flop receives the power supply state signal transmitted by the firmware control unit. The clock end of the data flip-flop receives a storage triggering signal transmitted by the firmware control unit. The output end of the data flip-flop outputs a power supply state storage signal. A first input end of the OR gate receives the power supply state storage signal. A second input end of the OR gate receives the utility power supply signal. An output end of the OR gate outputs the stored power supply state signal.

In one embodiment, the basic input output unit executes the second power booting program, so as to reduce an operating frequency of a central processing unit of the electronic device, reduce a memory access frequency, shut down a video output function, a hard disk access function, an audio output function and a universal serial port function.

In one embodiment, the network communication function is a link layer discovery protocol function.

Another aspect of the disclosure relates to a start-up method applied to an electronic device with a Power over Ethernet function, and the start-up method includes following steps. An Ethernet interface of the electronic device is determined whether to be inserted with a network cable, so as to receive a power supply from a power supply apparatus with Power over Ethernet via the network cable. When the power supply is received, a power supply state signal is checked, so as to determine whether the power supply state of the power supply is in a first power mode. When the power supply state is not in the first power mode, a second power booting program is executed on the electronic device, so that the electronic device possesses a network communication function and the power consumption of the electronic device is smaller than or equal to a rated power of the power supply. The electronic device communicates with the power supply apparatus via a network, so as to increase the rated power of the power supply to a first rated power value. The power supply state signal is set and stored, so that the power supply state of the power supply is in the first power mode. The electronic device is restarted.

In one embodiment, the start-up method further includes following steps. When the power supply state is in the first power mode, a start-up signal is received. When the start-up signal is received, a normal booting program is executed, so as to start up the electronic device.

Other remaining implementation details of the method for starting up an electronic device can be referred to in the above-mentioned description, thereby not be described repeatedly herein.

BRIEF DESCRIPTION OF THE DRAWINGS

The disclosure will become more fully understood from the detailed description given herein below for illustration only, and thus does not limit the disclosure, wherein.

DETAILED DESCRIPTION

Figure 1:
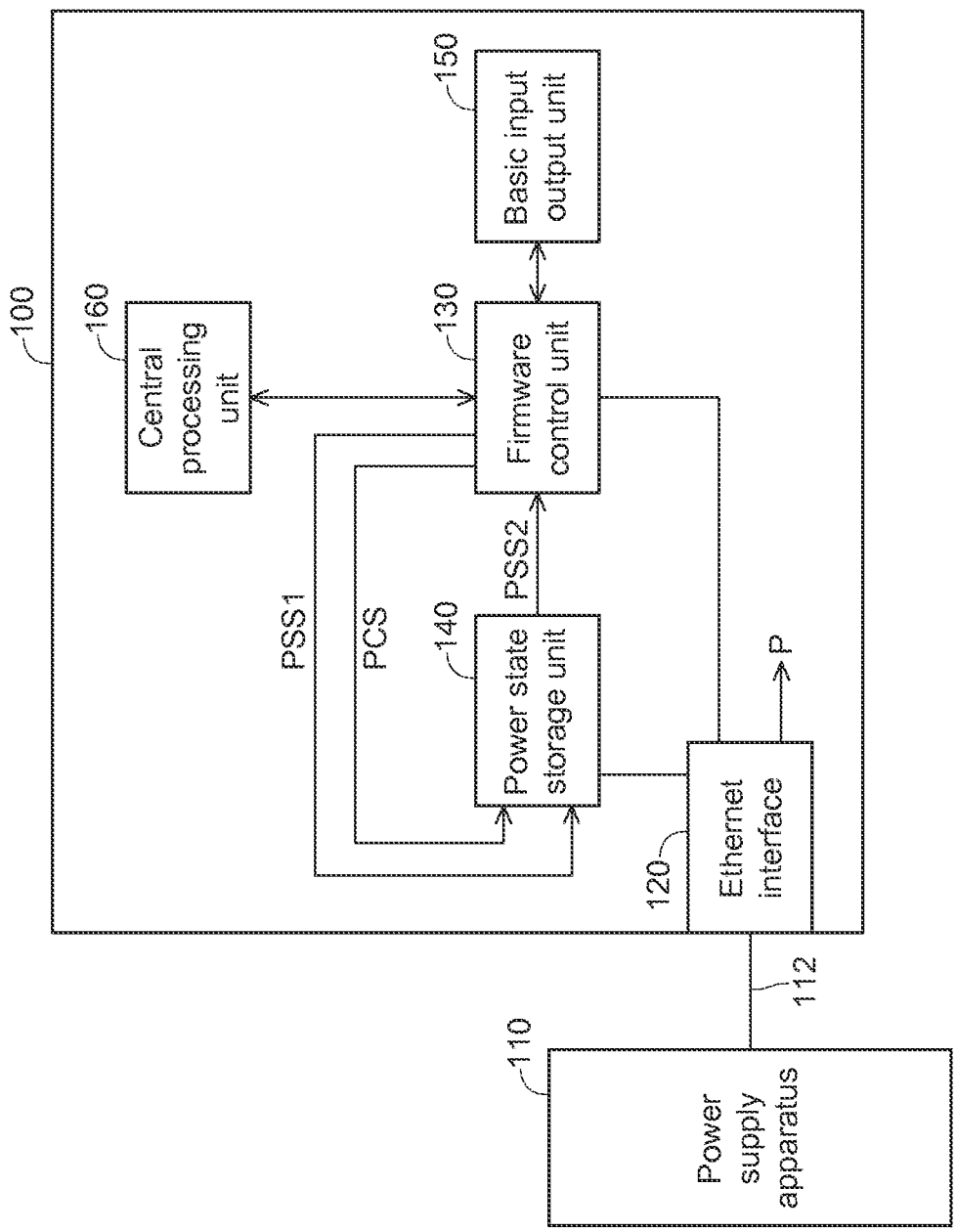
FIG. 1 is a block diagram of an electronic device with power over Ethernet according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram of an electronic device 100 with power over Ethernet according to an embodiment of the disclosure. The electronic device 100 includes an Ethernet interface 120, a firmware control unit 130, a power supply state storage unit 140 and a basic input output unit 150. In this embodiment, the electronic device 100 belongs to a powered device in the power over Ethernet technology. The electronic device 100 and the power supply apparatus 110 both support the 802.3af specification and the 802.3 second type specification, so as to transmit power supply P via an Ethernet interface 120 (such as the RJ45 interface), and to mutually perform communication and coordination through a network protocol. That is, the Ethernet interface 120 is coupled to the power supply apparatus 110 with power over Ethernet, so as to receive the power supply P via a network cable 112. The network cable 112 is a twisted pair.

In some embodiments, the electronic device 100 can receive the power supply P via the network cable 112, and can also receive a power supply through existing utility power technologies. The electronic device 100 uses a software and hardware manner within to automatically switch the source of the power supply. Hence, the electronic device 100 can be a consuming electronic device or a network-related device, for example, a notebook, a tablet, a high power wireless transmission device, a router, a bridge or a Webcam, which has a central processing unit 160 and requires higher power to boot and operate.

The firmware control unit 130 is coupled to the Ethernet interface 120, the power supply state storage unit 140, the basic input output unit 150 and the central processing unit 160. The firmware control unit 130 is embodied by using a firmware controller hub (FCH), or other control manner such as a chipset or a south bridge chip. In this embodiment, the firmware control unit 130 can possess a network chip function and detect the corresponding power over Ethernet specification via the Ethernet interface 120 and a network protocol. Thus, the firmware control unit 130 can learn the rated power of the power supply P according to the power over Ethernet specification of the power supply apparatus 110, so as to set a power supply state signal PSS1.

The power supply state storage unit 140 is coupled to and controlled by the firmware control unit 130. The firmware control unit 130 utilizes the power supply state storage unit 140 and a storage triggering signal PCS to store the power supply state signal PSS1 and outputs the stored power supply state signal PSS2 at the output end thereof. In addition, the basic input output unit 150 is coupled to the firmware control unit 130. In this embodiment, the basic input output unit 150 can be the basic input output system (BIOS) in a computer device, which is mainly used for assisting the relevant booting program of the electronic device 100.

In this embodiment, the electronic device 100 and the power supply apparatus 110 both support the 802.3af specification and 802.3 second type specification. The main difference between the 802.3af specification and 802.3 second type specification lies as follows. The power supply apparatus (POE) under the 802.3af specification can provide an electronic power up to 15.40 watt (w), and the powered device receives an average electronic power of 12.95 watt (w) for its usage, and some electronic power may be consumed by a transmission media, such as the network cable 112 and so on. The 802.3 second type specification can provide a large electronic power so as to drive a powered device that has higher power consumption requirements. For example, the power supply apparatus under the 802.3 second type specification can provide an electronic power up to 34.2 watt (w), and the powered device can receive an average electronic power of 25.5 watt (w).

In some embodiment, the power supply apparatus 110 employs the link layer (Layer2) manner. In other words, when the powered device communicates with the power supply apparatus 110 via the network using the link layer discovery protocol, the power supply apparatus 110 is passively switched to operate under the power over Ethernet specification required by the powered device. For example, the electronic device 100 operates under the 802.3 Second type specification with higher power instead of the preset 802.3af specification.

Accordingly, the disclosure first determines the Ethernet power supply specification of the power supply apparatus 110 before the electronic device 100 boots or starts up. When the Ethernet power supply specification (or referred to as power supply) of the power supply apparatus 110 does not meet the high power mode of the electronic device, only the network function of the electronic device 100 is enabled to communicate with the power supply apparatus 110, and the Ethernet power supply specification of the electronic device 100 is changed, thereby obtaining enough electronic power. Then, the enough electronic power obtained by the power over Ethernet can be used for normally starting up the electronic device 100 without modifying the software and hardware design of the power supply apparatus 110.

Figure 2:
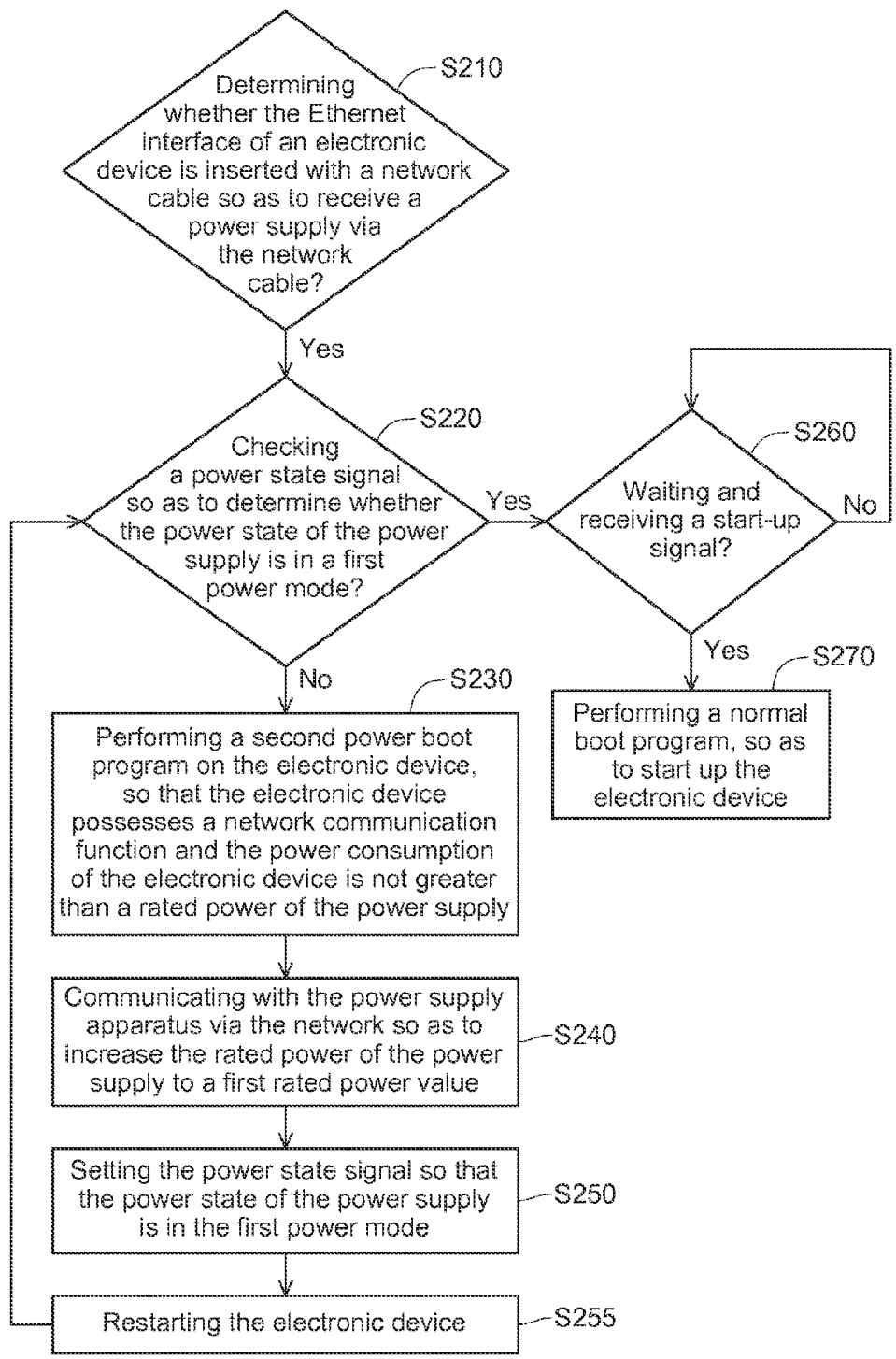
FIG. 2 is a flowchart of a start-up method of an electronic device according to an embodiment of the disclosure.

Therefore, this embodiment can be implemented by the electronic device 100 in FIG. 1 and the flowchart of FIG. 2. FIG. 2 is a flowchart of a start-up method of an electronic device 100 according to an embodiment of the disclosure. In step S210, when the electronic device 100 just receives a power supply, the Ethernet interface 120 of the electronic device 100 is determined whether to be inserted with the network cable 112 and receive the power supply P from the power supply apparatus 110 with the power over Ethernet via the network cable 112.

When the Ethernet interface 120 is not inserted with the network cable 112, it indicates that this power supply is supplied by the utility power. When booting the electronic device 100, the electronic device 100 may have enough power to operate. Therefore, the basic input output unit 150 in the electronic device 100 waits until the user presses the booting button of the electronic device 100 and receives a start-up signal caused by the booting button (step S260), so as to execute a normal booting program and normally start up the electronic device 100 (step S270).

In contrast, when the power supply P received by the electronic device 100, is received by the Ethernet interface 120 via the network cable, the firmware control unit 130 first checks the stored power supply state signal PSS2 (step S220), so as to determine whether the power supply state of the power supply P is in the first power mode (i.e. a high power mode). The high power mode here is a large electronic power that can be provided to the powered device under the above-mentioned 802.3at second type specification rather than the electronic power provided under the 802.3af (802.3at first type) specification. In other words, the step of determining the power supply state of the power supply P can also used for determining whether the power over Ethernet specification of the power supply apparatus 110 fits the electronic device 100. In addition, step S210 can be performed by elements such as the firmware control unit 130, the basic input output unit 150 or a baseboard management controller and so on, and this embodiment is not limited to the above-mentioned disclosure.

When the power supply state of the power supply P is not in the first power mode (high power mode), the basic input output unit 150 executes the second power booting program (i.e. low power booting program) (step S230), so that the electronic device 100 possesses the network communication function, and the power consumption of the electronic device 100 is equal to or smaller than the rated power of the power supply P. The second power booting program (low power booting program) in this embodiment is modified from the original normal booting program, and the second power booting program shuts down most of the power consumption function, For example, the second power booting program reduces the operating frequency of the central processing unit 160 of the electronic device 100 and the access frequency of the memory, and disables the video output (VGA) function, the hardware access function, the audio output function and the universal serial port (USB) function, but only remains some of the operation function and network communication function. Thus, after the second power booting program is executed, the power consumption of the electronic device 100 may be less than or equal to the rated power (such as average electronic power 12.95 w of the 802.3af specification) of the power supply P under the current POE specification. Herein, it can be implemented more preferably that the power consumption of the electronic device 100 is lower than 12.95 w. The network communication function in step S230 can specially refer to the link layer discovery protocol (LLDP) function. The link layer discovery protocol (LLDP) provides a standard link layer (Layer2) network device discovery method, which can encapsulate information main capabilities, an address management, a device identifier, and an interface identifier of the local terminal in a link layer discovery protocol data unit (LLDPDU), so as to distribute such information to other network devices directly connected thereto. Those network devices received this information store the information in the form of standard management information base (MIB), for querying and determining the communication condition of each network device among the networks. Hence, the firmware control unit 130 of the electronic device 100 can learn the POE specification of the power supply apparatus 110 via the link layer discovery protocol (LLDP), and communicate and coordinate with the power supply apparatus 110.

After the second power booting program is executed, the electronic device 100 can possess the network communication function. Hence, in step S240, the firmware control unit 130 communicates with the power supply apparatus 110 via the network, so as to increase the rated power of the power supply P to the first rated power value. That is, the firmware control unit 130 switches the POE specification in the power supply apparatus 110 from the preset 802.3af (802.3at Type1) specification to the 802.3at second type specification via the network, so that the rated power of the power supply P is changed from 12.95 w to 25.5 w (i.e. the first rated power value).

In step S250, the firmware control unit 130 sets the power supply state signal PSS1, so that the power supply state of the power supply P is in the first power mode, and stores the power supply state signal PSS1 via the power supply state storage unit 140 and the storage triggering signal PCS. The power supply state of the power supply P is in the first power mode (high power mode, i.e. 802.3at second type specification) when the power supply state signal PSS1 and the stored power supply state signal PSS2 are enabled. When the power supply state signal PSS1 and the stored power supply state signal PSS2 are disabled, it indicates that the power supply state of the power supply P is not in the first power mode. On the other hand, this embodiment can also implement the disclosure via a reversed state. Then, in step S225, the electronic device 100 is restarted.

After the electronic device 100 is restarted, since the firmware control unit 130 has already set the power supply state signal PSS1 as enabled in the above-mentioned step S250 so as to indicate that the power supply state of the power supply P is in the first power mode, and that the power supply state storage unit 140 stores the power supply state as an enabled power supply state signal PSS2, the firmware control unit 130 determines that the power supply state of the power supply P is in the first power mode in step S220. Afterward, the process proceeds to step S260, so that the basic input output unit 150 waits and receives a start-up signal (step S260) and executes a normal booting program so as to start up the electronic device 100.

In contrast, when the user pulls out the network cable 112 from the Ethernet interface 120 in the steps S210 to S270, the Ethernet interface outputs a pull-out signal correspondingly. Hence, the firmware control unit 130 or the power supply state storage unit 140 resets the stored power supply state signal PSS2 according to the pull-out signal, so as to avoid the situation where the POE specification of the power supply apparatus 110 is mistakenly considered as the first power mode (high power mode) all the time. In other words, when the user mistakenly pulls out the network cable 112 and then inserts the network cable 112 into the Ethernet interface 120 again, a part of the power supply apparatus 110 may return to the preset 802.3af specification to supply the electronic device 100. The electronic device 100 has to reset the stored power supply state signal PSS2 so as to avoid the electronic device 100 from being unable to start up.

In another aspect, the power supply state storage unit 140 in this embodiment further receives a utility power supply signal AC_IN. When the electronic device 100 receives the utility power as the power supply, the utility power supply signal AC_IN is enabled. Herein, the power supply state storage unit 140 sets the stored power supply state signal PSS2 as enabled, so as to directly perform the normal booting program without steps S230 to 255 in FIG. 2.

Figure 3:
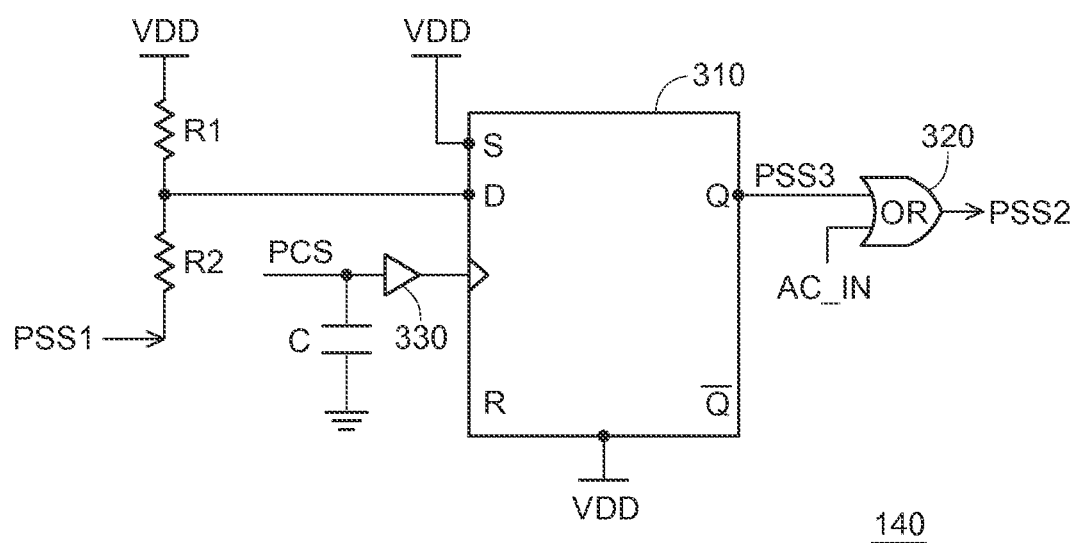
FIG. 3 is a circuit diagram of a power supply state storage unit.

FIG. 3 is a circuit diagram of the power supply state storage unit 140. The power supply state storage unit 140 includes a data flip-flop (DFF) 310 and an OR gate 320. The date end D of the data flip-flop 310 is connected to the intermediate joint of a divider circuit including the resistors R1 and R2. One end of the divider circuit is connected to the power supply voltage VDD, and the other end thereof receives the power supply state signal PSS1 transmitted by the firmware control unit 130 in FIG. 1. The clock end of the data flip-flop 310 receives the storage triggering signal PCS transmitted by the firmware control unit 130, via a buffer 330 and a capacitor C. The output end Q of the data flip-flop 310 outputs a power supply state storage signal PSS3. A first input end of the OR gate 320 receives the power supply state storage signal PSS3, a second input end thereof receives the utility power supply signal AC_IN, and an output end thereof outputs the stored power supply state signal PSS2.

Hereinafter, Table (1) is a partial true value table of the power supply state storage unit 140 in FIG. 3:

TABLE 1

| State | PSS1 | PCS | AC_IN | Q | PSS2 |
|---|---|---|---|---|---|
| 1 | 0 | 0 | 0 | 0 | 0 |
| 2 | 1 | 0 | 0 | 0 | 0 |
| 3 | 1 | 0→1 | 0 | 1 | 1 |
| 4 | X | X | 1 | X | 1 |

According to FIG. 3 and Table (1) above, state 1 indicates the situation where the firmware control unit 130 detects that the power supply apparatus 110 operates under the 802.3af (802.3at first type) specification and does not receive the utility power, via the Ethernet interface 120 and the link layer discovery protocol (LLDP). Herein, the power supply state signal PSS1 is set as 0 (disabled), and the utility power supply signal AC_IN is 0 (disabled), therefore, the stored power supply state signal PSS2 is 0 (disabled).

State 2 is the situation where the firmware control unit 130 detects that the power supply apparatus 110 operates under the 802.3at second type specification and does not receive the utility power. Herein, the power supply state signal PSS1 is set as 1 (enabled), the utility power supply signal AC_IN is 0 (disabled). Since the storage triggering signal PCS does not trigger the clock end of the data flip-flop 310, the stored power supply state signal PSS2 is still 0 (disabled). State 3 is that when the firmware control unit 130 outputs a storage triggering signal PCS to trigger the clock end of the data flip-flop 310. Herein, the power supply state signal PSS1, which is set as 1 (enabled), causes the output end of the data flip-flop 310 to set the power supply state storage signal PSS3 as 1 (enabled) and set the stored power supply state signal PSS2 as 1 (enabled). State 4 is when the electronic device 100 receives the utility power to boot or operate, the utility power supply signal AC_IN is 1 (enabled), and the stored power supply state signal PSS2 remains as 1 (enabled), regardless of the change of other signals.

The electronic device disclosed in the embodiments of the disclosure first determines whether the power supply state is a high power supply mode before booting, so as to determine whether the electronic power of the power supply is enough. If the electronic power of the power supply is insufficient (i.e. the power supply state is not in the high power supply mode), the electronic device executes a power-saving mode in which the power consumption is lower than a preset electronic power (such as 12.95 w of 802.3af specification). Herein, the electronic device is only in the network function and has shut down other functions. Then, the electronic device communicates with the power supply apparatus via the network, so as to change the power over Ethernet specification, so as to obtain enough electronic power and enable the electronic device to boot normally. Therefore, the electronic device can utilize the power over Ethernet technology to obtain enough electronic power to boot normally during the booting by the cooperation of the software and the hardware.

What is claimed is:

1. An electronic device, comprising:
   an Ethernet interface, coupled to a power supply apparatus with a Power over Ethernet, for receiving a power supply via a network cable;
   a firmware control unit, coupled to the Ethernet interface, for setting a power supply state signal according to a rated power of the power supply;
   a power supply state storage unit, coupled to the firmware control unit, for storing the power supply state signal; and
   a basic input output unit, coupled to the firmware control unit;
   wherein when the electronic device receives the power supply, the firmware control unit checks the power supply state signal so as to determine whether the power supply state of the power supply is in a first power mode;
   when the power supply state is not in the first power mode, the basic input output unit performs a second power booting program, and then the electronic device possesses a network communication function, and power consumption of the electronic device is smaller than or equal to the rated power of the power supply; and
   the firmware control unit communicates with the power supply apparatus via a network so as to increase the rated power of the power supply to a first rated power value, set the power supply state signal to control the power supply state of the power supply to be in the first power mode, and restart the electronic device.

2. The electronic device according to claim 1, wherein when the power supply state is in the first power mode, the basic input output unit receives a start-up signal so as to execute a normal booting program to start up the electronic device.

3. The electronic device according to claim 1, wherein the electronic device and the power supply apparatus both support a 802.3af specification and a 802.3 second type specification, and when the firmware control unit communicates with the power supply apparatus via the network, the power supply apparatus operates under the 802.3 second type specification instead of the 802.3af specification Second type, so as to increase the rated power of the power supply to the first rated power value.

4. The electronic device according to claim 1, wherein the Ethernet interface generates a pull-out signal when the network cable is pulled out from the Ethernet interface, the firmware control unit further receives the pull-out signal so as to reset the stored power supply state signal, the power supply state storage unit further receives a utility power supply signal, and when the utility power supply signal is enabled, the power supply state signal is enabled.

5. The electronic device according to claim 4, wherein the power supply storage unit comprises:
- a data flip-flop, the data end of the data flip-flop receiving the power supply state signal transmitted by the firmware control unit, the clock end of the data flip-flop receiving a storage triggering signal transmitted by the firmware control unit, and the output end of the data flip-flop outputting a power supply state storage signal; and
- an OR gate, a first input end of the OR gate receiving the power supply state storage signal, a second input end of the OR gate receiving an utility power supply signal, and an output end of the OR gate outputting the stored power supply state signal.

6. The electronic device according to claim 1, wherein the basic input output unit executes the second power booting program, so as to reduce an operating frequency of a central processing unit of the electronic device, reduce a memory access frequency, shut down a video output function, a hard disk access function, an audio output function and an universal serial port function.

7. A start-up method, applied to an electronic device with a Power over Ethernet function, and comprising:
- determining whether an Ethernet interface of the electronic device is inserted with a network cable to receives a power supply from a power supply apparatus with a Power over Ethernet via the network cable;
- when the power supply is received, checking a power supply state signal so as to determine whether the power supply state of the power supply is in a first power mode;
- when the power supply state is not in the first power mode, executing a second power booting program on the electronic device, wherein the electronic device possesses a network communication function, and power consumption of the electronic device is smaller than or equal to a rated power of the power supply;
- communicating with the power supply apparatus via a network, so as to increase the rated power of the power supply to a first rated power value;
- setting and storing the power supply state signal to control the power supply state of the power supply to be in the first power mode; and
- restarting the electronic device.

8. The start-up method according to claim 7, further comprising:
- when the power supply state is in the first power mode, receiving a start-up signal; and
- when the start-up signal is received, executing a normal booting program so as to start up the electronic device.

9. The start-up method according to claim 7, wherein the electronic device and the power supply apparatus both support a 802.3af specification and a 802.3 second type specification, and
- the step of increasing the rated power of the power supply to the first rated power value, comprising:
- making a communication between the firmware control unit and the power supply apparatus via the network, so as to control the power supply apparatus to operate under the 802.3 second type specification instead of the 802.3af specification.

10. The start-up method according to claim 7, further comprising:
- when the network cable is pulled out from the Ethernet interface, outputting a pull-out signal; and
- resetting the stored power supply state signal according to the pull-out signal.

* * * * *